United States Patent
Wang et al.

(10) Patent No.: US 12,385,109 B2
(45) Date of Patent: Aug. 12, 2025

(54) DEVICE AND METHOD FOR EFFICIENTLY SEPARATING ETHYL TIN FROM MOLTEN TIN

(71) Applicant: YUNNAN TIN CO. LTD. TIN BRANCH, Honghe (CN)

(72) Inventors: Mingjiang Wang, Honghe (CN); Zhilu Li, Honghe (CN); Fan Bai, Honghe (CN); Haibin Yuan, Honghe (CN); Chi Zhang, Honghe (CN); Zhang Zhang, Honghe (CN); Wanli Xu, Honghe (CN); Duzuo Tang, Honghe (CN); Jianwei Wang, Honghe (CN); Sheng Lei, Honghe (CN); Wei Mao, Honghe (CN); Hongwu Jia, Honghe (CN)

(73) Assignee: YUNNAN TIN CO. LTD. TIN BRANCH, Honghe (CN)

( * ) Notice: Subject to any disclaimer, the term of this patent is extended or adjusted under 35 U.S.C. 154(b) by 688 days.

(21) Appl. No.: 17/693,326

(22) Filed: Mar. 12, 2022

(65) Prior Publication Data

US 2023/0104576 A1    Apr. 6, 2023

Related U.S. Application Data

(63) Continuation of application No. PCT/CN2022/075961, filed on Feb. 11, 2022.

(30) Foreign Application Priority Data

Sep. 27, 2021    (CN) .......................... 202111137398.X

(51) Int. Cl.
*B66C 3/06* (2006.01)
*C22B 9/02* (2006.01)
*C22B 25/08* (2006.01)

(52) U.S. Cl.
CPC .............. *C22B 25/08* (2013.01); *C22B 9/023* (2013.01)

(58) Field of Classification Search
CPC .... B66C 3/02; B66C 3/06; B66C 3/14; C22B 25/08; C22B 9/023

(Continued)

(56) References Cited

U.S. PATENT DOCUMENTS

| 2,216,383 | A | * | 10/1940 | Brandon | ................... | B66C 3/06 |
| | | | | | | 294/110.2 |
| 2,242,940 | A | * | 5/1941 | Caoli | ....................... | B66C 3/06 |
| | | | | | | 37/184 |

(Continued)

*Primary Examiner* — Paul T Chin
(74) *Attorney, Agent, or Firm* — HOWARD M COHN and Associates, LLC

(57) ABSTRACT

A device for efficiently separating ethyl tin from molten crude tin is disclosed. The device includes grab buckets, connecting rods, an inverted T-shaped push rod, alloy legs, a hanger plate, a cylinder and a lifting ring; wherein one end of the connecting rod is fixedly connected with one side of the grab bucket, and the other end of the connecting rod is detachably connected with the bottom end of the inverted T-shaped push rod; a top flange of the inverted T-shaped push rod is detachably connected with the bottom flange of the cylinder through threads, and the inverted T-shaped push rod is powered by the cylinder to push and pull. The device has simple structure, small volume, light weight, convenient use and placement, reduced occupancy rate of production site space and flexible use; the invention adopts a remote control mode, mechanized operation, higher safety and labor saving.

5 Claims, 2 Drawing Sheets

(58) Field of Classification Search
USPC .................................................. 294/68.23
See application file for complete search history.

(56) References Cited

U.S. PATENT DOCUMENTS

| | | | | |
|---|---|---|---|---|
| 3,606,435 A * | 9/1971 | Weber | ............ | E02F 3/413 |
| | | | | 294/68.23 |
| 3,881,263 A * | 5/1975 | Coeurderoy | ...... | E02F 3/3681 |
| | | | | 294/68.23 |
| 4,047,313 A * | 9/1977 | Bricon | ........... | E02F 3/413 |
| | | | | 37/406 |
| 4,124,243 A * | 11/1978 | Raffin | ........... | E02F 3/413 |
| | | | | 294/68.23 |
| 4,174,131 A * | 11/1979 | Gregg | ............ | B66C 3/06 |
| | | | | 294/68.23 |
| 4,807,918 A * | 2/1989 | Weeks | ........... | B66C 3/04 |
| | | | | 37/182 |
| 4,826,109 A * | 5/1989 | Camus | ........... | B64D 1/22 |
| | | | | 244/17.11 |
| 6,540,925 B2 * | 4/2003 | Takahashi | ...... | B01D 17/0214 |
| | | | | 210/776 |
| 10,458,583 B2 * | 10/2019 | Parks | ............ | F16L 37/144 |
| 10,473,250 B2 * | 11/2019 | Rusconi | .......... | F16L 37/23 |

\* cited by examiner

DEVICE AND METHOD FOR EFFICIENTLY SEPARATING ETHYL TIN FROM MOLTEN TIN

TECHNICAL FIELD

The present disclosure relates to the technical field of refining impurity removal in tin smelting, in particular to a device and method for efficiently separating ethyl tin from molten crude tin.

BACKGROUND ART

The molten crude tin produced by smelting the tin concentrate in the smelting furnace is first put into the tin-receiving forehearth in front of the furnace, and the molten crude tin in the forehearth will be layered due to the temperature reduction. In tin smelting, the liquid crude tin in the lower layer is called methyl tin, and the solidified part in the upper layer is called ethyl tin. Before the next stage of refining operation, it is necessary to separate methyl tin and ethyl tin.

The temperature of molten crude tin produced in the process of tin smelting is relatively high, generally between 950° C. and 1200° C. After entering the tin-receiving forehearth from the smelting furnace, the temperature gradually decreases, and ethyl tin with high impurities begins to precipitate on the surface. At this time, the temperature of the tin-receiving forehearth is generally between 700° C. and 900° C. In order to facilitate the separation of methyl tin and ethyl tin, reduce the amount of methyl tin entrained mechanically in the process of separating ethyl tin, and prevent the solidification of methyl tin and smooth transfer to the next refining process, the operation of separating ethyl tin must be performed at a relatively high temperature, that is, the salvaging operation of ethyl tin is started at the temperature of 700° C.~900° C., and it is required to be completed in a relatively short time.

The separation of methyl tin and ethyl tin is usually done by dredger, which makes use of the characteristics that ethyl tin contains high iron and arsenic impurities, can be solidified and precipitated at a higher temperature, and its density is lower than that of methyl tin, so that it is separated from liquid methyl tin from solid liquid. The traditional ethyl tin separation operation mainly relies on manual salvaging, and the tool used is a long pole ladle, which requires two people to cooperate in the operation, holding the long pole one after the other and operating at the same time, not only has the potential safety hazard of scalding, but also has great labor intensity, and at the same time, the fishing tool is greatly worn out. The traditional way of ethyl tin separation is not only high labor intensity, high safety risk and low operation efficiency, but also requires a lot of labor, consumes fishing tools quickly and has poor economy.

Therefore, it is a technical problem that technicians in this field need to solve urgently to provide a device and method that can replace manual labor, has simple structure and can adapt to high-temperature environment and efficiently separate ethyl tin from molten crude tin, so as to achieve the purposes of cost reduction, efficiency increase, reasonable optimization of human resources and elimination of potential safety hazards.

SUMMARY

The disclosure aims at solving the problems of high potential safety hazard, low operation efficiency and high labor intensity in the process of separating ethyl tin in the prior art at least to a certain extent.

For this purpose, an object of the present disclosure is to provide a device for efficiently separating ethyl tin from molten crude tin, including grab buckets, connecting rods, an inverted T-shaped push rod, alloy legs, a hanger frame, a cylinder and a lifting ring;

wherein one end of the connecting rod is fixedly connected with one side of the grab bucket, and the other end of the connecting rod is detachably connected with the bottom end of the inverted T-shaped push rod; one end of the alloy leg is fixedly connected with one side of the grab bucket, and the other end of the alloy leg is detachably connected with the bottom end of the hanger frame;

the cylinder is sleeved inside the hanger frame, and the cylinder is detachably connected with the hanger frame through bolts and passes through the central hole of the hanger frame; the lifting ring is fixed at the top of the hanger frame;

the top end of the inverted T-shaped push rod is provided with a flange, the bottom end of the cylinder is provided with a cylinder push rod, and the bottom end of the cylinder push rod is provided with a flange;

the top flange of the inverted T-shaped push rod is detachably connected with a bottom flange of the cylinder through threads, and the inverted T-shaped push rod is powered by the cylinder to push and pull.

Further, the side of the grab bucket is provided with multiple square holes, the square holes are regularly arranged, a side length of the square holes is 20-30 mm, and a distance between two adjacent square holes is 30-50 mm;

Furthermore, the bottom surface of the grab bucket is provided with multiple circular holes, the circular holes are regularly arranged, a diameter of the circular holes is 10-25 mm, and the distance between two adjacent circular holes is 10-25 mm.

Further, multiple connecting rods are provided, the number of connecting rods is even, and any two connecting rods are symmetric.

Furthermore, the grab bucket includes a first grab bucket and a second grab bucket, the first grab bucket and the second grab bucket are mirror-symmetrical with an inverted T-shaped push rod as a center.

Furthermore, multiple alloy legs are provided, the number of alloy legs is even, and any two alloy legs are symmetrical.

Further, the lifting ring is composed of an inverted U-shaped steel ring and an alloy foot fixing frame, the inverted U-shaped alloy steel structure and the alloy foot fixing frame are detachably connected by bolts, and the alloy foot fixing frame is fixed on the top of the lifting plate.

Further, the device for efficiently separate the ethyl tin from the molten crude tin further includes a quick connector, a high temperature-resistant metal hose and a remote-controlled electromagnetic valve; the quick connector is fixed on the high-temperature resistant metal hose to divide the high-temperature resistant metal hose into two detachably connected sections; one end of the high-temperature resistant metal hose is connected with the cylinder, and the other end of the high-temperature resistant metal hose is connected with the remote-controlled electromagnetic valve.

The present disclosure also provides a method for efficiently separating ethyl tin from molten crude tin, including the following steps:

(1) with the above-described device, hanging the lifting ring on the device for efficiently separating ethyl tin from molten crude tin on a lifting hook of a lifting equipment above a tin-receiving forehearth;

(2) connecting the remote-controlled electromagnetic valve with the cylinder through a high-temperature resistant metal hose, connecting the remote-controlled electromagnetic valve with a compressed air source, and the air source valve is opened;

(3) when the surface of molten coarse tin in the tin-receiving forehearth begins to appear solidified precipitated ethylene tin, controlling the electromagnetic valve by the remote controller to provide compressed air for the cylinder, pushing the inverted T-shaped push rod 3 by the cylinder, and then the inverted T-shaped push rod provides power for the grab 1, so that the grab is opened after rotating through a movable connection point of the alloy leg, controlling the lifting equipment to slowly lower down the salvaging ethyl tin device until the device is immersed into the molten tin solution, controlling the electromagnetic valve to provide a closed air source for apow cylinder, after the power transmission through the connection point, the grab bucket is closed, and controlling the lifting equipment to slowly rise until leaving the molten coarse tin liquid level, after the lifting equipment is controlled to slowly rise until leaving the molten coarse tin level, filtering the excess tin is by hovering above the tin-receiving forehearth, and controlling the lifting equipment to place the salvaged ethyl tin into the tin-receiving slag bucket beside the tin-receiving forehearth;

(4) after repeating the step (3) for several times, the separation process of ethyltin in a high-temperature state is completed;

(5) after the operation of salvaging ethyltin, controlling the lifting equipment to lift the device for efficiently separating ethyltin from molten crude tin to the fixed position, removing the lifting ring from the lifting hook of the lifting equipment, closing a compressed air source valve, disconnecting the high-temperature resistant metal hose connecting the cylinder and the solenoid valve through a quick connector, and putting away the metal hose.

Further, the hovering time in step (3) is 5-15 s.

The disclosure has the advantages that: in the design of the grab bucket, the disclosure fully combines the practical experience in production and designs uniformly distributed small round holes on the bottom of the bucket, in the wall of the bucket, a large square hole is designed which can ensure the strength of the bucket and discharge the tin rapidly, this design method can not only effectively extract ethyl tin but also avoid the entrainment of a large amount of ethyl tin, and also ensure the sufficient strength of the grab; in terms of power selection, the pneumatic mode is selected in the disclosure, which avoids the high damage rate and potential safety hazard caused by selecting electric and hydraulic power modes in the high-temperature operation environment; the disclosure makes full use of the original equipment in the production site, greatly reduces the equipment investment and improves the utilization rate of the original equipment.

The device of the disclosure is simple in structure, small in volume, light in weight, convenient to use and place, reducing the occupancy rate of production site space and flexible to use; in the process of salvaging ethyl tin, the disclosure adopts a remote control mode, mechanized operation, and personnel work far away from the high-temperature area, which is safer and saves labor force compared with the original mode of relying heavily on manpower.

BRIEF DESCRIPTION OF THE DRAWINGS

Next, the technical solutions in the embodiments of the present disclosure will be clearly and completely described with reference to the drawings in the embodiments of the present disclosure, obviously, the described embodiments are only part of the embodiments of the present disclosure, not all of them. Based on the embodiments in the present disclosure, all other embodiments obtained by ordinary technicians in the field without creative work are within the scope of the present disclosure.

Figure 1:
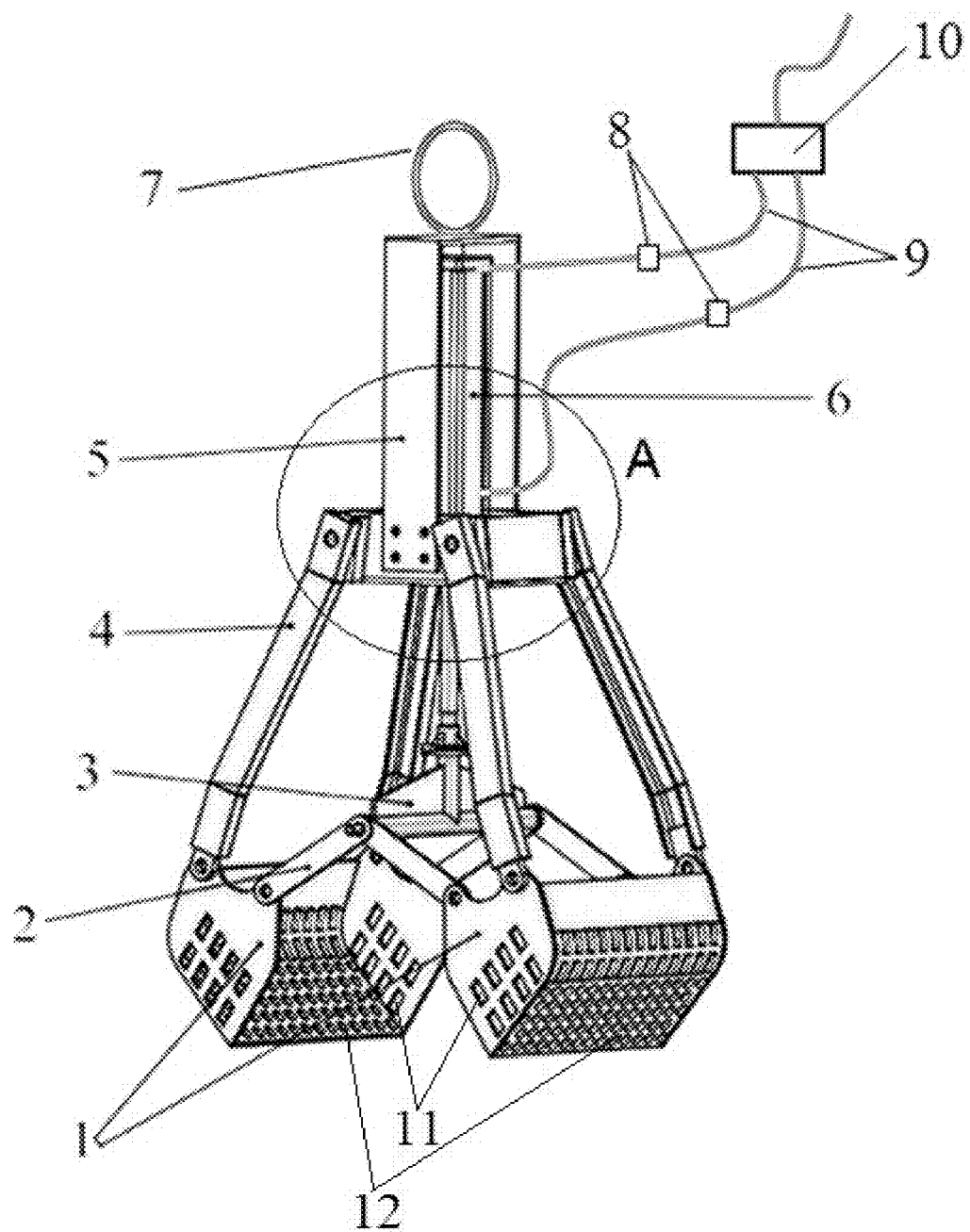
FIG. 1 is a schematic structural diagram of a device for efficiently separating ethyl tin from molten crude tin provided by the present disclosure.
Figure 2:
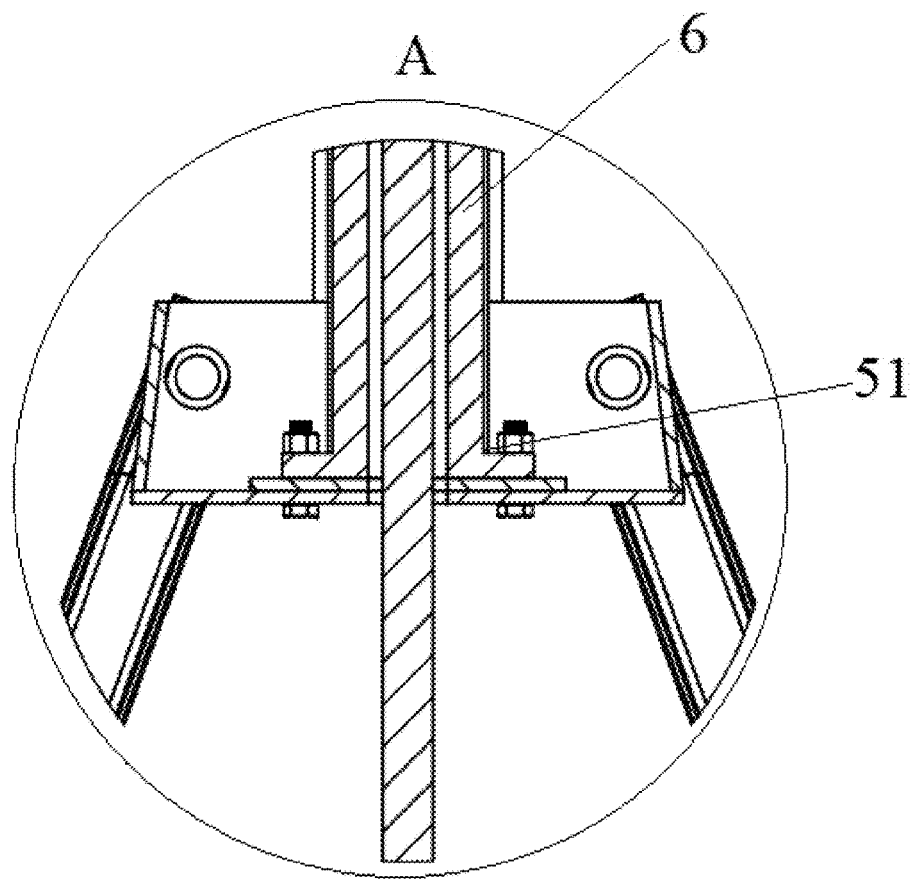
FIG. 2 is a sectional view of part A in FIG. 1.
Figure 3:
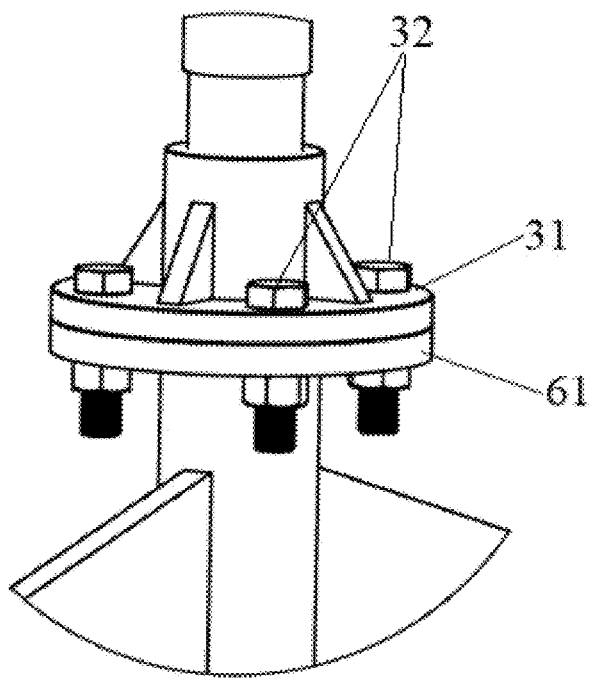
FIG. 3 shows connection between the bottom flange of a cylinder and the top flange of the inverted T-shaped push rod of the present disclosure.

In the drawings, the list of structures represented by each label is as follows: 1—grab bucket, 11—square hole, 12—circular hole, 2—connecting rod, 3—inverted T-shaped push rod, 31—top flange, 32—thread, 4—alloy leg, 5—hanger frame, 51—central hole, 6—cylinder, 61—bottom flange, 7—lifting ring, 8—quick connector, 9—high-temperature resistant metal hose, and 10—remote-controlled electromagnetic valve.

DETAILED DESCRIPTION OF THE EMBODIMENTS

In the following, embodiments of the disclosure are described in detail, examples of which are shown in the accompanying drawings in which the same or similar reference numerals throughout denote the same or similar elements or elements having the same or similar functions. The embodiments described below with reference to the drawings are exemplary and are intended to be used to explain the present disclosure and are not to be construed as limiting the present disclosure.

In the description of the present disclosure it is to be understood that, terms "up," "down," "front," "back," "left," "right," "vertical," "horizontal," "top," "bottom" and "inside," the orientation or positional relationship indicated by "outside" etc. is based on the orientation or positional relationship shown in the drawings, and is merely for ease of description and simplification of the description of the disclosure, rather than indicating or implying that the device or element referred to must have a particular orientation, be constructed and operated in a particular orientation, and thus are not to be construed as limiting the disclosure.

In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of the features. In the description of the present disclosure, "plural" means two or more, unless otherwise specifically defined.

In the present disclosure, unless otherwise specified and limited, the terms "installation", "connection", "connection" and "fixation" should be broadly understood, for example, they can be fixed connection, detachable connection or integrated; it can be mechanically or electrically connected; it can be directly connected or indirectly connected through an intermediate medium, and it can be the internal communication of two elements or the interaction between two elements. For ordinary technicians in the field, the specific meanings of the above terms in the present disclosure can be understood according to specific situations.

In the present disclosure, unless otherwise specified and limited, the first feature "above" or "below" the second feature may include the direct contact between the first and second features, or the contact between the first and second features instead of direct contact but through another feature between them. Furthermore, the first feature "above", "above" and "above" of the second feature includes that the first feature is directly above and obliquely above the second feature, or simply indicates that the horizontal height of the first feature is higher than that of the second feature. The first feature "below", "below" and "below" of the second feature includes that the first feature is directly below and obliquely below the second feature, or simply indicates that the horizontal height of the first feature is smaller than that of the second feature.

A device for efficiently separating ethyl tin from molten crude tin includes grab buckets 1, connecting rods 2, an inverted T-shaped push rod 3, alloy legs 4, a hanger frame 5, a cylinder 6 and a lifting ring 7;

wherein, one end of the connecting rod 2 is fixedly connected with one side of the grab bucket 1, and the other end of the connecting rod 2 is detachably connected with the bottom end of the inverted T-shaped push rod 3; one end of the alloy leg 4 is fixedly connected with one side of the grab bucket 1, and the other end of the alloy leg 4 is detachably connected with the bottom end of the hanger frame 5;

the cylinder 6 is sleeved inside the hanger frame 5, and the cylinder 6 is detachably connected with the hanger frame 5 through bolts and passes through the central hole of the hanger frame 5; the lifting ring 7 is fixed at the top of the hanger frame 5;

a top flange 31 of the inverted T-shaped push rod 3 is detachably connected with a bottom flange 61 of the cylinder 6 through threads 32, and the inverted T-shaped push rod 3 is powered by the cylinder 6 to push and pull.

In one embodiment, the side of the grab bucket 1 is provided with multiple square holes 11, the multiple square holes 11 are regularly arranged, a side length of the square holes is 20-30 mm, and a distance between two adjacent square holes is 30-50 mm;

In one embodiment, the bottom surface of the grab bucket 1 is provided with multiple circular holes, the multiple circular holes 12 are regularly arranged, a diameter of the circular holes 12 is 10-25 mm, and the distance between two adjacent circular holes is 10-25 mm.

In one embodiment, multiple connecting rods are provided, the number of connecting rods is even, and any two connecting rods are symmetric.

In another embodiment, the grab bucket 1 includes a first grab bucket and a second grab bucket, the first grab bucket and the second grab bucket are mirror-symmetrical with an inverted T-shaped push rod 3 as a center.

In another embodiment, multiple alloy legs are provided, the number of alloy legs is even, and any two alloy legs are symmetrical.

In one embodiment, quick connectors 8, high temperature-resistant metal hoses 9 and a remote-controlled electromagnetic valve 10 are also included; the quick connector 8 is fixed on the high-temperature resistant metal hose 9 to divide the high-temperature resistant metal hose 9 into two detachably connected sections; one end of the high-temperature resistant metal hose 9 is connected with the cylinder 6, and the other end of the high-temperature resistant metal hose 9 is connected with the remote-controlled electromagnetic valve 10.

Embodiment 1

A method for efficiently separating ethyl tin from molten crude tin, including the following steps:
(1) with the above-described device, hanging the lifting ring on the device for efficiently separating ethyl tin from molten crude tin on a lifting hook of a lifting equipment above a tin-receiving forehearth;
(2) connecting the remote-controlled electromagnetic valve with the cylinder through a high-temperature resistant metal hose, connecting the remote-controlled electromagnetic valve with a compressed air source, and the air source valve is opened;
(3) when the surface of molten coarse tin in the tin-receiving forehearth begins to appear solidified precipitated ethylene tin, controlling the electromagnetic valve by the remote controller to provide compressed air for the cylinder, pushing the inverted T-shaped push rod 3 by the cylinder, and then the inverted T-shaped push rod provides power for the grab 1, so that the grab is opened after rotating through a movable connection point of the alloy leg, controlling the lifting equipment to slowly lower down the salvaging ethyl tin device until the device is immersed into the molten tin solution, controlling the electromagnetic valve to provide a closed air source for apow cylinder, after the power transmission through the connection point, the grab bucket is closed, and controlling the lifting equipment to slowly rise until leaving the molten coarse tin liquid level, after the lifting equipment is controlled to slowly rise until leaving the molten coarse tin level, filtering the excess tin is by hovering above the tin-receiving forehearth, and controlling the lifting equipment to place the salvaged ethyl tin into the tin-receiving slag bucket beside the tin-receiving forehearth;
(4) after repeating the step (3) for several times, the separation process of ethyltin in a high-temperature state is completed;
(5) after the operation of salvaging ethyltin, controlling the lifting equipment to lift the device for efficiently separating ethyltin from molten crude tin to the fixed position, removing the lifting ring from the lifting hook of the lifting equipment, closing a compressed air source valve, disconnecting the high-temperature resistant metal hose connecting the cylinder and the solenoid valve through a quick connector, and putting away the metal hose.

Application Example

In a forehearth of the submerged top-blown smelting furnace with an annual output of 70000 t of coarse tin, an ethyl tin separating device composed of the main components with grab volume of 0.35 $m^3$ (the bottom of the grab is uniformly distributed with small holes, the hole diameter is 15 mm, and the same shaft hole edge spacing is 20 mm; the side of grab bucket is evenly distributed with square holes, with a side length of 25 mm and an edge distance of 30 mm from the same shaft hole), cylinder model of SC160X600S and solenoid valve model of 4V330C-10, is used to cooperate with 5 t single-beam crane in the production site. In the operation of the device, the number of operators who savaged ethylene tin in a single bed is reduced from 6 to 2, the working time is shortened from 2.5 h to 0.5 h, the working efficiency is obviously improved, and 9800 t ethyl tin is salvaged all year round.

In the description of this specification, referring to the description of the terms "one embodiment", "some embodiments", "examples", "concrete examples" or "some examples" means that the specific features, structures, materials or characteristics described in connection with this embodiment or example are included in at least one embodiment or example of the present disclosure. In this specification, the schematic expressions of the above terms do not necessarily refer to the same embodiments or examples. Furthermore, the specific features, structures, materials or characteristics described may be combined in any one or more embodiments or examples in a suitable manner. In addition, those skilled in the art can join and combine different embodiments or examples described in this specification.

What is claimed is:

1. A device for efficiently separating ethyl tin from molten crude tin, comprising:
    grab buckets, connecting rods, an inverted T-shaped push rod, alloy legs, a hanger frame, a cylinder and a lifting ring;
    wherein one end of the connecting rod is fixedly connected with one side of the grab bucket, and the other end of the connecting rod is detachably connected with the bottom end of the inverted T-shaped push rod;
    one end of the alloy leg is fixedly connected with one side of the grab bucket, and the other end of the alloy leg is detachably connected with the bottom end of the hanger frame;
    the cylinder is sleeved inside the hanger frame, and the cylinder is detachably connected with the hanger frame through bolts and passes through a central hole of the hanger frame;
    the lifting ring is fixed at the top of the hanger frame; and
    a top flange of the inverted T-shaped push rod is detachably connected with a bottom flange of the cylinder through threads, and the inverted T-shaped push rod is powered by the cylinder to push and pull.

2. The device of claim 1, wherein the side of the grab bucket is provided with a plurality of square holes, the plurality of square holes are regularly arranged, a side length of the square holes is 20-30 mm, and a distance between two adjacent square holes is 30-50 mm;
    the bottom surface of the grab bucket is provided with a plurality of circular holes, the plurality of circular holes are regularly arranged, a diameter of the circular holes is 10-25 mm, and the distance between two adjacent circular holes is 10-25 mm.

3. The device of claim 1, wherein a plurality of connecting rods are provided, the number of connecting rods is even, and any two connecting rods are symmetric.

4. The device of claim 3, wherein the grab bucket comprises a first grab bucket and a second grab bucket, the first grab bucket and the second grab bucket are mirror-symmetrical with an inverted T-shaped push rod as a center.

5. The device of claim 4, wherein a plurality of alloy legs are provided, the number of alloy legs is even, and any two alloy legs are symmetrical.

* * * * *